US012679100B2

(12) United States Patent
Haga et al.

(10) Patent No.: US 12,679,100 B2
(45) Date of Patent: Jul. 14, 2026

(54) LIQUID EJECTING APPARATUS AND CONTROL METHOD OF LIQUID EJECTING APPARATUS

(71) Applicant: SEIKO EPSON CORPORATION, Tokyo (JP)

(72) Inventors: Nanami Haga, Shiojiri (JP); Yuki Hirabayashi, Shiojiri (JP); Seiji Tojo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 239 days.

(21) Appl. No.: 18/505,763

(22) Filed: Nov. 9, 2023

(65) Prior Publication Data

US 2024/0157704 A1 May 16, 2024

(30) Foreign Application Priority Data

Nov. 10, 2022 (JP) ................................ 2022-180117

(51) Int. Cl.
*B41J 2/175* (2006.01)
*B41J 2/165* (2006.01)

(52) U.S. Cl.
CPC ......... *B41J 2/17509* (2013.01); *B41J 2/1652* (2013.01); *B41J 2/17596* (2013.01); *B41J 2002/16582* (2013.01)

(58) Field of Classification Search
CPC .. B41J 2/17509; B41J 2/1652; B41J 2/17596; B41J 2002/16582; B41J 2/16579
See application file for complete search history.

(56) References Cited

U.S. PATENT DOCUMENTS

| | | | | |
|---|---|---|---|---|
| 2007/0229572 | A1* | 10/2007 | Nishida | B41J 2/1755 347/19 |
| 2022/0016898 | A1 | 1/2022 | Sakai | |

FOREIGN PATENT DOCUMENTS

| | | | | | |
|---|---|---|---|---|---|
| CN | 100421954 | C | * 10/2008 | B41J 2/17513 |
| JP | H10119310 | A | * 5/1998 | |
| JP | 2018138335 | A | * 9/2018 | B41J 2/01 |
| JP | 6737059 | B2 | * 8/2020 | B41J 2/1721 |
| JP | 2022-018221 | A | 1/2022 | |

* cited by examiner

*Primary Examiner* — Sharon Polk
(74) *Attorney, Agent, or Firm* — WORKMAN NYDEGGER

(57) ABSTRACT

A liquid ejecting apparatus includes: a head that ejects a liquid from a nozzle; a mounting portion on which a liquid container in which the liquid is sealed is detachably mounted; a sub-tank in which the liquid supplied from the liquid container is stored; a connection channel connected to the sub-tank and the head; an opening and closing valve positioned in the connection channel; and a control portion, in which when the liquid container is replaced, the control portion closes the opening and closing valve.

4 Claims, 4 Drawing Sheets

LIQUID EJECTING APPARATUS AND CONTROL METHOD OF LIQUID EJECTING APPARATUS

The present application is based on, and claims priority from JP Application Serial Number 2022-180117, filed Nov. 10, 2022, the disclosure of which is hereby incorporated by reference herein in its entirety.

BACKGROUND

1. Technical Field

The present disclosure relates to a liquid ejecting apparatus and a control method of the liquid ejecting apparatus.

2. Related Art

JP-A-2022-18221 describes a liquid ejecting apparatus that includes a head in which a nozzle is opened, a sub-tank connected to the head, and a mounting portion connected to the sub-tank. A liquid container that contains a liquid is mounted on the mounting portion. The liquid is supplied from the liquid container to the sub-tank by mounting the liquid container on the mounting portion.

In the liquid ejecting apparatus described in JP-A-2022-18221, the liquid container may be replaced. A new liquid container is usually degassed and therefore sealed under a negative pressure. Therefore, when the liquid container is replaced, the negative pressure in the liquid container may be applied to the head through the sub-tank. When the negative pressure is applied to the head, there is a possibility that air is drawn from the nozzle.

SUMMARY

According to an aspect of the present disclosure, a liquid ejecting apparatus includes: a head that ejects a liquid from a nozzle; a mounting portion on which a liquid container in which the liquid is sealed is detachably mounted; a sub-tank in which the liquid supplied from the liquid container is stored; a connection channel connected to the sub-tank and the head; an opening and closing valve positioned in the connection channel; and a control portion, in which when the liquid container is replaced, the control portion closes the opening and closing valve.

According to an aspect of the present disclosure, a control method of a liquid ejecting apparatus including a head that ejects a liquid from a nozzle, a mounting portion on which a liquid container in which the liquid is sealed is detachably mounted, a sub-tank in which the liquid supplied from the liquid container is stored, a connection channel that connects the sub-tank and the head, and an opening and closing valve positioned in the connection channel, includes: closing the opening and closing valve when the liquid container is replaced.

DESCRIPTION OF EMBODIMENTS

Hereinafter, an embodiment of a liquid ejecting apparatus will be described with reference to the drawings. The liquid ejecting apparatus is, for example, an ink jet printer that ejects ink, which is an example of a liquid, onto a medium such as paper or cloth to print an image such as a text or a picture.

Liquid Ejecting Apparatus

Figure 1:
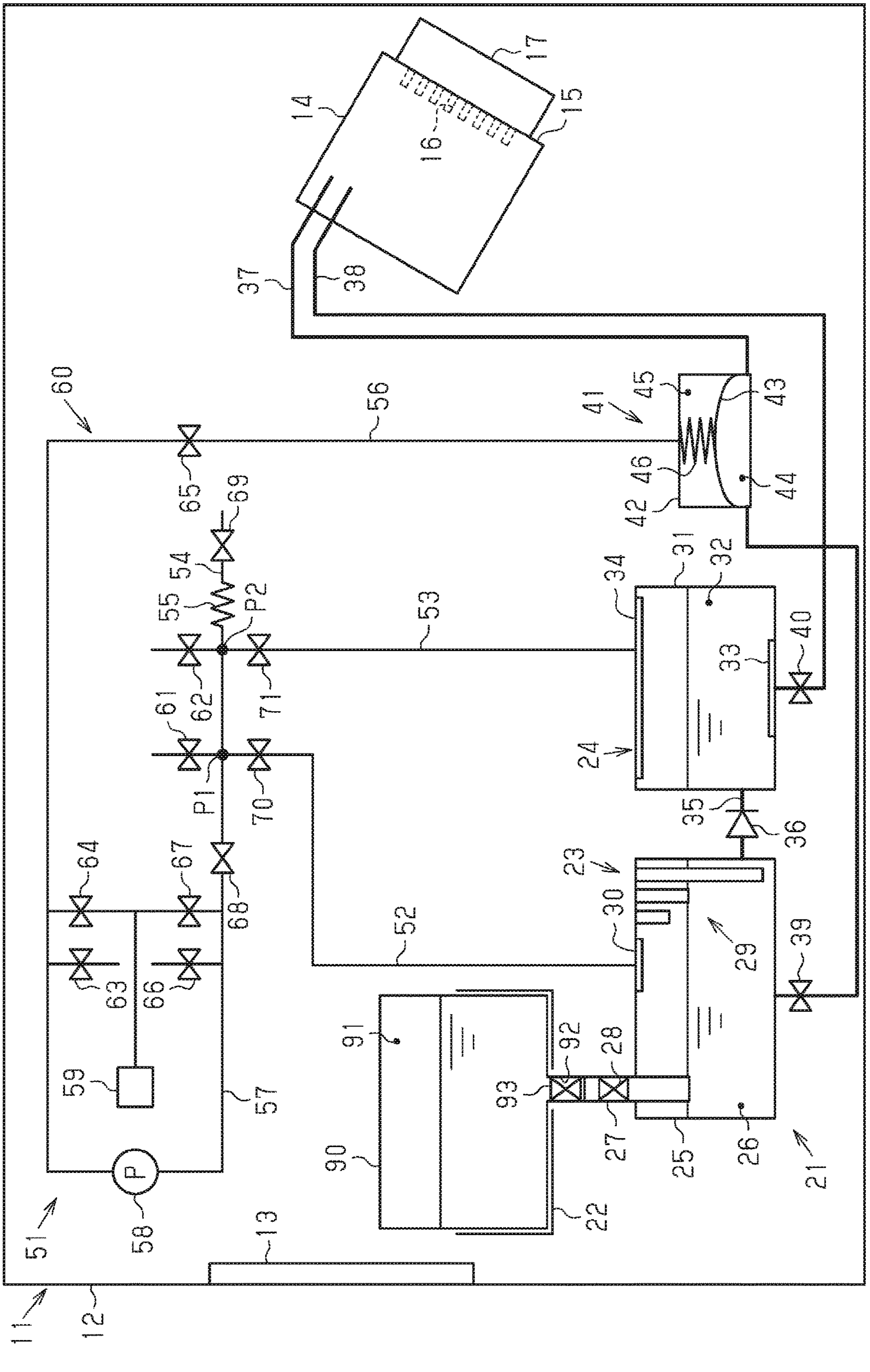
FIG. 1 is a schematic view illustrating an embodiment of a liquid ejecting apparatus.

As illustrated in FIG. 1, a liquid ejecting apparatus 11 includes a housing 12. The liquid ejecting apparatus 11 includes a cover 13. The cover 13 is attached to the housing 12. The cover 13 is configured to be opened and closed with respect to the housing 12. A user can access the inside of the housing 12 by opening the cover 13.

The liquid ejecting apparatus 11 includes a head 14. The head 14 is configured to eject the liquid. The head 14 ejects the liquid onto a medium to print an image on the medium. The head 14 has a nozzle surface 15. One or more nozzles 16 are opened in the nozzle surface 15. The head 14 ejects the liquid from the nozzles 16. In one example, the head 14 ejects the liquid in an inclined posture in which the nozzle surface 15 is inclined with respect to a horizontal plane. The head 14 is a line head capable of ejecting the liquid all at once across the width of the medium. The head 14 may be a serial head that ejects the liquid while scanning the medium.

The liquid ejecting apparatus 11 includes a maintenance portion 17. The maintenance portion 17 is configured to perform maintenance of the head 14. The maintenance portion 17 performs maintenance of the head 14 by receiving the liquid discharged from the head 14 by cleaning. The cleaning is an operation of forcibly discharging the liquid from the nozzles 16. By the cleaning, a thickened liquid, air bubbles, and the like are discharged from the head 14.

The cleaning includes pressure cleaning. The pressure cleaning is an operation of forcibly discharging the liquid from the nozzle 16 by pressurizing the inside of the head 14. In one example, the pressure cleaning is performed by pressurizing the inside of the head 14 with a pump 58 to be described below.

The cleaning includes suction cleaning. The suction cleaning is an operation of forcibly discharging the liquid from the nozzle 16 by performing suction on the inside of the head 14. In one example, the suction cleaning is performed by the maintenance portion 17 performing suction on the inside of the head 14.

The cleaning may include low-pressure cleaning. The low-pressure cleaning is an operation of forcibly discharging the liquid from the nozzle 16 by pressurizing the inside of the head 14, like the pressure cleaning. In one example, the low-pressure cleaning is performed by the pump 58 pressurizing the inside of the head 14. The amount of liquid discharged from the nozzle 16 is smaller in the low-pressure cleaning than in the pressure cleaning. Therefore, a cleaning strength of the low-pressure cleaning is lower than that of the pressure cleaning.

The maintenance portion 17 may perform maintenance of the head 14 by receiving the liquid ejected from the head 14 by flushing. The flushing is maintenance in which the head 14 ejects the liquid from the nozzle 16 as appropriate. Clogging of the nozzle 16 is suppressed by the flushing.

The maintenance portion 17 may perform maintenance of the head 14 by wiping the head 14. The wiping is an operation in which the maintenance portion 17 wipes the nozzle surface 15. The liquid, foreign matter, and the like are removed from the nozzle surface 15 by the wiping.

The maintenance portion 17 may perform maintenance of the head 14 by capping the head 14. The capping is an operation in which the maintenance portion 17 comes into contact with the head 14 to form a space communicating with the nozzle 16. The capping keeps the nozzle 16 moist.

The liquid ejecting apparatus 11 includes a supply mechanism 21. The supply mechanism 21 is configured to supply the liquid from a liquid container 90 to the head 14. The supply mechanism 21 is connected to the liquid container 90 and the head 14. The supply mechanism 21 may be configured to circulate the liquid between the liquid container 90 and the head 14.

The liquid container 90 is, for example, an ink cartridge. The liquid container 90 defines a containing chamber 91. The containing chamber 91 is a space in which the liquid is contained. An outlet port 92 is opened in the liquid container 90. The outlet port 92 communicates with the containing chamber 91. The liquid contained in the containing chamber 91 is led out to the supply mechanism 21 through the outlet port 92.

The liquid container 90 includes an outlet valve 93. The outlet valve 93 is positioned to block the outlet port 92. The outlet valve 93 is opened when the liquid container 90 is connected to the supply mechanism 21. When the outlet valve 93 is closed, the containing chamber 91 is a closed space. In particular, in a new liquid container 90, the containing chamber 91 is sealed in a degassed state. Therefore, in the new liquid container 90, a pressure in the containing chamber 91 is a negative pressure.

The supply mechanism 21 includes a mounting portion 22. The mounting portion 22 is configured in such a way that the liquid container 90 is mounted thereon. The liquid container 90 is detachable from the mounting portion 22. In one example, the liquid container 90 can be replaced by opening the cover 13. The liquid can be supplied from the liquid container 90 to the head 14 by mounting the liquid container 90 on the mounting portion 22. The outlet valve 93 is opened by mounting the liquid container 90 on the mounting portion 22.

The supply mechanism 21 includes one or more sub-tanks. The sub-tank is configured to store the liquid supplied from the liquid container 90. The sub-tank temporarily stores the liquid between the liquid container 90 and the head 14. In one example, the supply mechanism 21 includes a first sub-tank 23 and a second sub-tank 24.

The first sub-tank 23 is connected to the mounting portion 22. The first sub-tank 23 is supplied with the liquid from the liquid container 90. The first sub-tank 23 may be supplied with the liquid from the head 14. That is, the liquid may be returned from the head 14 to the first sub-tank 23. The first sub-tank 23 includes a first reservoir 25. The first reservoir 25 defines a first storage chamber 26 in which the liquid is stored.

The first sub-tank 23 includes an introduction pipe 27. The introduction pipe 27 is connected to the first reservoir 25. The introduction pipe 27 extends inside and outside the first reservoir 25. The introduction pipe 27 extends to penetrate through a top surface of the first reservoir 25. A lower end of the introduction pipe 27 is positioned inside the first reservoir 25, that is, in the first storage chamber 26. An upper end of the introduction pipe 27 is positioned outside the first reservoir 25.

The introduction pipe 27 is connected to the liquid container 90 mounted on the mounting portion 22. As the introduction pipe 27 is connected to the liquid container 90, the liquid is introduced into the first storage chamber 26 through the introduction pipe 27. At this time, the liquid is introduced from the liquid container 90 into the first storage chamber 26 due to a head difference between the liquid container 90 and the first sub-tank 23. Specifically, as air flows from the first storage chamber 26 to the containing chamber 91 through the introduction pipe 27, the liquid flows from the containing chamber 91 to the first storage chamber 26 through the introduction pipe 27. Therefore, in the first sub-tank 23, the liquid is stored in such a way that a position of the lower end of the introduction pipe 27 and a position of a liquid surface coincide with each other. In the first sub-tank 23, the position of the liquid surface is below the nozzle surface 15.

The first sub-tank 23 includes an introduction valve 28. The introduction valve 28 is positioned in the introduction pipe 27. The introduction valve 28 is configured to open when the liquid container 90 is mounted on the mounting portion 22. When the liquid container 90 is mounted on the mounting portion 22, the introduction valve 28 is opened before the outlet valve 93. Accordingly, a possibility that the liquid leaks from the liquid container 90 is reduced.

The first sub-tank 23 may include a liquid level sensor 29. The liquid level sensor 29 detects the level of the liquid stored in the first storage chamber 26. Specifically, the liquid level sensor 29 detects the liquid level by detecting the liquid surface of the liquid stored in the first storage chamber 26. In one example, the liquid level sensor 29 detects the position of the liquid surface in multiple stages. The liquid level sensor 29 detects at least the position of the liquid level that coincides with the position of the lower end of the introduction pipe 27.

The first sub-tank 23 may include a first separation membrane 30. The first separation membrane 30 is a membrane that is permeable to gas but impermeable to liquid. In one example, the first separation membrane 30 is attached to the top surface of the first reservoir 25. The first separation membrane 30 reduces a possibility that the liquid stored in the first reservoir 25 flows into a first opening channel 52 described below.

The second sub-tank 24 is connected to the first sub-tank 23. The second sub-tank 24 is supplied with the liquid from the first sub-tank 23. Therefore, the second sub-tank 24 is supplied with the liquid from the liquid container 90 through the first sub-tank 23.

The second sub-tank 24 includes a second reservoir 31. The second reservoir 31 defines a second storage chamber 32 in which the liquid is stored. The second sub-tank 24 stores the liquid in such a way that the position of the liquid surface in the first sub-tank 23 and a position of a liquid surface in the second sub-tank 24 coincide with each other. Therefore, the position of the liquid surface in the second sub-tank 24 usually coincides with the position of the lower end of the introduction pipe 27. In the second sub-tank 24, the position of the liquid surface is below the nozzle surface 15 similarly to the first sub-tank 23.

The second sub-tank 24 may include a filter 33. In one example, the filter 33 is attached to a bottom surface of the second reservoir 31. The filter 33 collects foreign matter from the liquid flowing from the second sub-tank 24 to the head 14.

The second sub-tank 24 may include a second separation membrane 34. In one example, the second separation membrane 34 is positioned at a top surface of the second reservoir 31. Similarly to the first separation membrane 30, the second separation membrane 34 is a membrane that is permeable to gas but impermeable to liquid. The second separation membrane 34 reduces a possibility that the liquid stored in the second reservoir 31 flows into a second opening channel 53 described below.

The supply mechanism 21 includes a supply channel 35. The supply channel 35 is connected to the first sub-tank 23 and the second sub-tank 24. The liquid is supplied from the first sub-tank 23 to the second sub-tank 24 through the supply channel 35. The liquid may be supplied from the second sub-tank 24 to the first sub-tank 23 through the supply channel 35.

The supply mechanism 21 may include a supply valve 36. The supply valve 36 is positioned in the supply channel 35. The supply valve 36 allows the liquid to flow from the first sub-tank 23 to the second sub-tank 24. The supply valve 36 regulates the liquid from flowing from the second sub-tank 24 to the first sub-tank 23. As described above, the supply valve 36 is, for example, a one-way valve. The supply valve 36 is opened and closed according to a pressure difference between the first sub-tank 23 and the second sub-tank 24. The supply valve 36 is opened, for example, when a pressure in the first sub-tank 23 is higher than a pressure in the second sub-tank 24. That is, the supply valve 36 is closed when the pressure in the second sub-tank 24 is equal to or lower than the pressure in the first sub-tank 23. As a result, in the second sub-tank 24, the liquid is normally stored in such a way that the position of the liquid surface in the first sub-tank 23 and the position of the liquid surface in the second sub-tank 24 coincide with each other. The supply valve 36 is not limited to a one-way valve, and may be a solenoid valve controlled according to the pressure difference between the first sub-tank 23 and the second sub-tank 24.

The supply mechanism 21 includes one or more connection channels. The connection channel is a channel connected to the sub-tank and the head 14. In one example, the supply mechanism 21 includes a first connection channel 37 and a second connection channel 38. The first connection channel 37 is a channel that connects the first sub-tank 23 and the head 14. The liquid may be supplied from the first sub-tank 23 to the head 14 through the first connection channel 37. The liquid may be supplied from the head 14 to the first sub-tank 23 through the first connection channel 37. The second connection channel 38 is a channel connected to the second sub-tank 24 and the head 14. The liquid may be supplied from the second sub-tank 24 to the head 14 through the second connection channel 38. The liquid may be supplied from the head 14 to the second sub-tank 24 through the second connection channel 38.

A circulation channel is formed between the sub-tank and the head 14 by the supply channel 35, the first connection channel 37, and the second connection channel 38. In one example, as the liquid flows from the second sub-tank 24 to the head 14 through the second connection channel 38, and the liquid flows from the head 14 to the first sub-tank 23 through the first connection channel 37, the liquid circulates between the sub-tank and the head 14. As a result, a possibility of thickening of the liquid, formation of precipitates, or the like due to the liquid stagnating in the supply mechanism 21 and the head 14 is reduced.

The supply mechanism 21 includes one or more opening and closing valves. The opening and closing valve is a valve positioned in the connection channel. In one example, the supply mechanism 21 includes a first opening and closing valve 39 and a second opening and closing valve 40. The first opening and closing valve 39 is positioned in the first connection channel 37. The first opening and closing valve 39 opens and closes the first connection channel 37. The second opening and closing valve 40 is positioned in the second connection channel 38. The second opening and closing valve 40 opens and closes the second connection channel 38.

The opening and closing valve is a normally open type solenoid valve. The normally open type valve is a valve that is in an open state when not energized. Therefore, the first opening and closing valve 39 and the second opening and closing valve 40 are normally in an open state. For example, the first opening and closing valve 39 and the second opening and closing valve 40 are in an open state while the liquid ejecting apparatus 11 is powered off.

The opening and closing valve is closed when the liquid container 90 is replaced. When the liquid container 90 is replaced in a state in which the opening and closing valve is opened, a negative pressure inside the liquid container 90 mounted on the mounting portion 22 may be applied to the head 14 through the sub-tank. When the negative pressure is applied to the head 14, there is a possibility that air is drawn through the nozzle 16. As a result, there is a possibility that the meniscus of the liquid formed at the nozzle 16 may be disrupted. In this case, the nozzle 16 cannot normally eject the liquid. That is, the ejection state of the nozzle 16 becomes faulty. As the opening and closing valve is closed when the liquid container 90 is replaced, a possibility that the negative pressure inside the liquid container 90 is applied to the head 14 is reduced.

The opening and closing valve may be closed when the head 14 does not eject the liquid onto the medium, for example, during standby. As a result, a possibility that the liquid leaks from the head 14 can be reduced when vibration or impact is applied to the liquid ejecting apparatus 11.

The supply mechanism 21 includes a slight pressurization section 41. The slight pressurization section 41 is positioned in the connection channel. The slight pressurization section 41 is configured to pressurize the liquid in the connection channel. In one example, the slight pressurization section 41 is positioned in the first connection channel 37. Specifically, the slight pressurization section 41 is positioned between the first opening and closing valve 39 and the head 14 in the first connection channel 37. Therefore, the slight pressurization section 41 pressurizes the liquid in the first connection channel 37.

The slight pressurization section 41 includes a container 42. The container 42 is positioned in the first connection channel 37. The slight pressurization section 41 includes a flexible member 43. The flexible member 43 is positioned within the container 42. The flexible member 43 divides a space inside the container 42 into a liquid chamber 44 and an air chamber 45. The liquid chamber 44 is a space in which the liquid is contained. The liquid chamber 44 communicates with the first connection channel 37. Therefore, the liquid flowing through the first connection channel 37 flows into the liquid chamber 44. The air chamber 45 is a space in which air is contained. The flexible member 43 separates the air and the liquid inside the container 42. The air chamber 45 communicates with an air channel 56 described below.

The slight pressurization section 41 includes a spring 46. The spring 46 is attached to the container 42 and the flexible member 43. The spring 46 is positioned in the air chamber 45. The spring 46 pushes the flexible member 43 in such a way that a volume of the liquid chamber 44 is reduced. The spring 46 pressurizes the liquid in the liquid chamber 44, that is, the liquid in the first connection channel 37.

The slight pressurization section 41 performs the low-pressure cleaning. When the air chamber 45 is depressurized through the air channel 56, the liquid is drawn into the liquid chamber 44 from the first sub-tank 23. At this time, there is little possibility that the meniscus of the liquid formed at the nozzle 16 draws the liquid from the head 14 into the liquid chamber 44. Thereafter, when the depressurization in the air chamber 45 is released, the liquid is sent from the liquid chamber 44 to the head 14 by the spring 46. As a result, the liquid is forcibly discharged from the nozzle 16.

The liquid ejecting apparatus 11 includes an adjustment mechanism 51. The adjustment mechanism 51 is configured to adjust a pressure in the supply mechanism 21. For example, the adjustment mechanism 51 adjusts the pressure in the first sub-tank 23, the second sub-tank 24, the slight pressurization section 41, or the like. The adjustment mechanism 51 causes the liquid to flow in the supply mechanism 21 by adjusting the pressure in the supply mechanism 21. For example, the adjustment mechanism 51 causes the liquid to flow from the sub-tank to the head 14 or causes the liquid to flow from the head 14 to the sub-tank. That is, the adjustment mechanism 51 supplies the liquid from the sub-tank to the head 14 or circulates the liquid between the sub-tank and the head 14.

The adjustment mechanism 51 includes one or more opening channels. The opening channel is a channel that opens the inside of the sub-tank to the atmosphere. The opening channel is connected to the sub-tank. In one example, the adjustment mechanism 51 includes a first opening channel 52 and a second opening channel 53.

The first opening channel 52 is connected to the first sub-tank 23. Specifically, the first opening channel 52 is connected to a top surface of the first sub-tank 23. The inside of the first sub-tank 23 is opened to the atmosphere through the first opening channel 52. More specifically, the inside of the first sub-tank 23 is opened to the atmosphere through the first opening channel 52 over the first separation membrane 30.

The second opening channel 53 is connected to the second sub-tank 24. Specifically, the second opening channel 53 is connected to a top surface of the second sub-tank 24. The inside of the second sub-tank 24 is opened to the atmosphere through the second opening channel 53. More specifically, the inside of the second sub-tank 24 is opened to the atmosphere through the second opening channel 53 over the second separation membrane 34.

The first opening channel 52 and the second opening channel 53 may be connected to each other. In one example, the first opening channel 52 and the second opening channel 53 are connected to each other by a capillary channel 54 described below. The first opening channel 52 and the second opening channel 53 may be channels independent of each other.

The adjustment mechanism 51 includes one or more capillary channels 54. The capillary channel 54 is a channel through which the inside of the sub-tank is opened to the atmosphere. The capillary channel 54 is connected to the sub-tank. The capillary channel 54 is a channel different from the opening channel. In one example, the adjustment mechanism 51 includes one capillary channel 54. In this case, the capillary channel 54 is a channel common to the first sub-tank 23 and the second sub-tank 24. The adjustment mechanism 51 may include separate capillary channels 54 for the first sub-tank 23 and the second sub-tank 24, respectively.

The capillary channel 54 may be connected to the opening channel. In one example, the capillary channel 54 is connected to a middle portion of the first opening channel 52 and a middle portion of the second opening channel 53. Specifically, the capillary channel 54 is connected to the first opening channel 52 at a first connection point P1. The capillary channel 54 is connected to the second opening channel 53 at a second connection point P2. In this case, the capillary channel 54 allows the inside of the sub-tank to be opened to the atmosphere through a part of the opening channel. It can also be said that the capillary channel 54 branches from the opening channel. The capillary channel 54 may be a channel independent of the opening channel. For example, the capillary channel 54 may be directly connected to the top surface of the sub-tank.

The capillary channel 54 includes a capillary portion 55. The capillary portion 55 is a portion having a small cross-sectional area in the capillary channel 54. Therefore, the capillary portion 55 is a portion where a channel resistance increases in the capillary channel 54. The capillary channel 54 allows the inside of the sub-tank to be opened to the atmosphere through the capillary portion 55. The capillary portion 55 may extend in a meandering form, or may extend while being bent multiple times. As a result, the channel resistance of the capillary portion 55 increases.

The inside of the sub-tank is maintained at an atmospheric pressure by opening the inside of the sub-tank to the atmosphere through the opening channel, the capillary channel 54, or both of the opening channel and the capillary channel 54. Meanwhile, since the sub-tank is opened to the atmosphere, the liquid in the sub-tank easily evaporates. Therefore, the inside of the sub-tank is normally opened to the atmosphere through the capillary channel 54. In this case, since the channel resistance of the capillary portion 55 is high, evaporation of the liquid is suppressed while the inside of the sub-tank is opened to the atmosphere. In the liquid ejecting apparatus 11, for example, when the pressure inside the sub-tank needs to be quickly returned to the atmospheric pressure, the inside of the sub-tank is opened to the atmosphere through the opening channel.

The adjustment mechanism 51 includes the air channel 56. The air channel 56 is a channel connected to the slight pressurization section 41. The air channel 56 communicates with the air chamber 45. The adjustment mechanism 51 may include a relay channel 57. The relay channel 57 is a channel connected to the opening channel. In one example, the relay channel 57 is connected to the first opening channel 52 and the second opening channel 53. Specifically, the relay channel 57 is connected to the first opening channel 52 at the first connection point P1. Therefore, the relay channel 57 is connected to the second opening channel 53 through the capillary channel 54.

The adjustment mechanism 51 includes one or more pumps 58. The pump 58 is, for example, a tube pump. The pump 58 is connected to the air channel 56. The pump 58 is connected to the relay channel 57. The pump 58 is connected to both the air channel 56 and the relay channel 57. The adjustment mechanism 51 may include a plurality of pumps 58. The adjustment mechanism 51 may include separate pumps 58 connected to the air channel 56 and the relay channel 57, respectively.

The pump 58 draws the air from the air channel 56 and sends the air into the air channel 56. In this way, the pump 58 adjusts a pressure inside the slight pressurization section 41. The pump 58 depressurizes the air chamber 45 through the air channel 56, for example. The pump 58 depressurizes the air chamber 45 to perform the low-pressure cleaning. The pump 58 can also pressurize the air chamber 45 through the air channel 56.

The pump 58 draws the air from the relay channel 57 or sends the air into the relay channel 57. In this way, the pump 58 adjusts the pressure in the sub-tank. The pump 58 pressurizes the inside of the sub-tank through the relay channel 57, for example. Specifically, the pump 58 pressurizes the inside of the first sub-tank 23, the inside of the second sub-tank 24, or both of the inside of the first sub-tank 23 and the inside of the second sub-tank 24 through the relay channel. The pressure cleaning is performed by the pump 58 pressurizing the inside of the sub-tank. The pump 58 can also depressurize the inside of the sub-tank through the relay channel 57. As the pump 58 depressurizes the inside of the first sub-tank 23 through the relay channel 57, the liquid is returned from the head 14 to the first sub-tank 23. In this way, the pump 58 causes the liquid to circulate.

The pump 58 sends the air drawn from the air channel 56 to the relay channel 57 or sends the air drawn from the relay channel 57 to the air channel 56. For example, as the pump 58 rotates in a forward direction, the air channel 56 is depressurized, and the relay channel 57 is pressurized. As the pump 58 rotates in a reverse direction, the air channel 56 is pressurized, and the relay channel 57 is depressurized.

The adjustment mechanism 51 may include a pressure sensor 59. In one example, the pressure sensor 59 is connected to the air channel 56 and the relay channel 57. The pressure sensor 59 detects a pressure in the air channel 56 and a pressure in the relay channel 57. The pressure sensor 59 can detect a pressure in the air chamber 45 through the air channel 56. In this way, the adjustment mechanism 51 easily adjusts the pressure in the slight pressurization section 41. The pressure sensor 59 can detect the pressure in the first sub-tank 23, the second sub-tank 24, or both of the first sub-tank 23 and the second sub-tank 24 through the relay channel 57. In this way, the adjustment mechanism 51 easily adjusts the pressure in the sub-tank.

The adjustment mechanism 51 may include a switching mechanism 60. The switching mechanism 60 is a mechanism for switching opening and closing of the opening channel, the capillary channel 54, the air channel 56, and the relay channel 57. The switching mechanism 60 is, for example, a selector valve that controls a combination of opening and closing the channels by rotating a rotating body including a plurality of cams. The switching mechanism 60 includes one or more valves.

The switching mechanism 60 includes one or more opening valves. The opening valve is a valve that allows the opening channel to communicate with the atmosphere. The opening valve is positioned in the opening channel. The opening valve opens and closes the opening channel. In one example, the switching mechanism 60 includes a first opening valve 61 and a second opening valve 62.

The first opening valve 61 is a valve that allows the first opening channel 52 to communicate with the atmosphere. The first opening valve 61 is positioned in the first opening channel 52. Specifically, the first opening valve 61 is at a position where a distance between the first opening valve 61 and the first sub-tank 23 is larger than a distance between the first connection point P1 and the first sub-tank 23 in the first opening channel 52. As the first opening valve 61 is opened, the first opening channel 52 is opened to the atmosphere.

The second opening valve 62 is a valve that allows the second opening channel 53 to communicate with the atmosphere. The second opening valve 62 is positioned in the second opening channel 53. Specifically, the second opening valve 62 is at a position where a distance between the second opening valve 62 and the second sub-tank 24 is larger than a distance between the second connection point P2 and the second sub-tank 24 in the second opening channel 53. As the second opening valve 62 is opened, the second opening channel 53 is opened to the atmosphere.

The opening valve may be opened when the liquid container 90 is replaced. When the liquid container 90 is replaced, a negative pressure inside the liquid container 90 mounted on the mounting portion 22 is applied to the sub-tank, and as a result, a pressure inside the sub-tank becomes a negative pressure. Therefore, when the liquid container 90 is replaced, the pressure in the sub-tank may be quickly returned to the atmospheric pressure. By opening the opening valve when the liquid container 90 is replaced, the negative pressure in the sub-tank is quickly eliminated.

The switching mechanism 60 includes a first selection valve 63. The first selection valve 63 is a valve that allows the air channel 56 to communicate with the atmosphere. As the first selection valve 63 is opened, the air chamber 45 can be opened to the atmosphere, and the air drawn from the relay channel 57 can be discharged to the atmosphere.

The switching mechanism 60 includes a second selection valve 64. The second selection valve 64 is a valve that allows the air channel 56 to communicate with the pressure sensor 59. As the second selection valve 64 is opened, the pressure sensor 59 can detect the pressure in the air channel 56.

The switching mechanism 60 includes a third selection valve 65. The third selection valve 65 is a valve that allows the air channel 56 to communicate with the pump 58. As the third selection valve 65 is opened, the pump 58 can depressurize or pressurize the air chamber 45.

The switching mechanism 60 includes a fourth selection valve 66. The fourth selection valve 66 is a valve that allows the relay channel 57 to communicate with the atmosphere. As the fourth selection valve 66 is opened, the air drawn from the air channel 56 can be discharged to the atmosphere.

The switching mechanism 60 includes a fifth selection valve 67. The fifth selection valve 67 is a valve that allows the relay channel 57 to communicate with the pressure sensor 59. As the fifth selection valve 67 is opened, the pressure sensor 59 can detect the pressure in the relay channel 57.

The switching mechanism 60 includes a sixth selection valve 68. The sixth selection valve 68 is a valve that allows the relay channel 57 to communicate with the opening channel. Specifically, the sixth selection valve 68 is a valve that allows the pump 58 to communicate with the first connection point P1 in the relay channel 57. As the sixth selection valve 68 is opened, the pump 58 can pressurize or depressurize the inside of the sub-tank through the relay channel 57 and the opening channel.

The switching mechanism 60 includes a seventh selection valve 69. The seventh selection valve 69 is a valve that allows the capillary channel 54 to communicate with the atmosphere. As the seventh selection valve 69 is opened, the capillary channel 54 is opened to the atmosphere. The seventh selection valve 69 is normally kept open in order to open the inside of the sub-tank to the atmosphere through the capillary channel 54.

The switching mechanism 60 includes an eighth selection valve 70. The eighth selection valve 70 is a valve that allows the capillary channel 54 to communicate with the first sub-tank 23. The eighth selection valve 70 is positioned between the first sub-tank 23 and the first connection point P1, for example, in the first opening channel 52. As the eighth selection valve 70 is opened, the capillary channel 54 communicates with the first sub-tank 23. Further, as the eighth selection valve 70 is opened, the relay channel 57 communicates with the first sub-tank 23. The eighth selection valve 70 is normally kept open in order to open the inside of the first sub-tank 23 to the atmosphere through the capillary channel 54.

The switching mechanism 60 includes a ninth selection valve 71. The ninth selection valve 71 is a valve that allows the capillary channel 54 to communicate with the second sub-tank 24. The ninth selection valve 71 is positioned between the second sub-tank 24 and the second connection point P2, for example, in the second opening channel 53. As the ninth selection valve 71 is opened, the capillary channel 54 communicates with the second sub-tank 24. Further, as the ninth selection valve 71 is opened, the relay channel 57 communicates with the second sub-tank 24. The ninth selection valve 71 is normally kept open in order to open the inside of the second sub-tank 24 to the atmosphere through the capillary channel 54.

When the pump 58 adjusts the pressure in the air chamber 45, the switching mechanism 60 opens the second selection valve 64, the third selection valve 65, and the fourth selection valve 66, and closes the other selection valves. As a result, when the pump 58 depressurizes the air chamber 45, the air in the air chamber 45 is discharged to the atmosphere through the air channel 56 and the relay channel 57. Further, when the pump 58 pressurizes the air chamber 45, air is sent from the atmosphere to the air chamber 45 through the relay channel 57 and the air channel 56. At this time, the pressure sensor 59 detects the pressure in the air chamber 45.

The switching mechanism 60 opens the opening valve and the eighth selection valve 70 when opening the inside of the first sub-tank 23 to the atmosphere. As a result, the first storage chamber 26 is opened to the atmosphere through the first opening channel 52. The pressure in the first sub-tank 23 is quickly returned to the atmospheric pressure through the first opening channel 52.

The switching mechanism 60 opens the opening valve and the ninth selection valve 71 when opening the inside of the second sub-tank 24 to the atmosphere. As a result, the second storage chamber 32 is opened to the atmosphere through the second opening channel 53. The pressure in the second sub-tank 24 is quickly returned to the atmospheric pressure through the second opening channel 53.

When pressurizing the inside of the first sub-tank 23, the switching mechanism 60 opens the first selection valve 63, the fifth selection valve 67, the sixth selection valve 68, and the eighth selection valve 70, and closes the other selection valves and opening valves. As a result, air is sent from the atmosphere into the first sub-tank 23 through the relay channel 57 and the first opening channel 52. At this time, the pressure sensor 59 detects the pressure in the first sub-tank 23.

When pressurizing the inside of the second sub-tank 24, the switching mechanism 60 opens the first selection valve 63, the fifth selection valve 67, the sixth selection valve 68, and the ninth selection valve 71, and closes the other selection valves and opening valves. As a result, air is sent from the atmosphere into the second sub-tank 24 through the relay channel 57 and the second opening channel 53. At this time, the pressure sensor 59 detects the pressure in the second sub-tank 24.

When the first sub-tank 23 and the second sub-tank 24 are filled with the liquid from the liquid container 90, the switching mechanism 60 opens the first sub-tank 23 and the second sub-tank 24 to the atmosphere in a state in which the first opening and closing valve 39 and the second opening and closing valve 40 are closed. As a result, the first sub-tank 23 is filled with the liquid from the liquid container 90, and the second sub-tank 24 is filled with the liquid from the first sub-tank 23.

When the head 14 ejects the liquid onto the medium, that is, when printing is performed, the switching mechanism 60 opens the first sub-tank 23 and the second sub-tank 24 to the atmosphere in a state in which the first opening and closing valve 39 and the second opening and closing valve 40 are opened. As a result, when printing is performed, the liquid is supplied from the first sub-tank 23 to the head 14 through the first connection channel 37. Further, the liquid is supplied from the second sub-tank 24 to the head 14 through the second connection channel 38. When printing is performed, the switching mechanism 60 may open the inside of the first sub-tank 23 and the inside of the second sub-tank to the atmosphere in a state in which the first opening and closing valve 39 is closed. Also in this case, the liquid is supplied from the second sub-tank 24 to the head 14 through the second connection channel 38.

When the liquid circulates, the switching mechanism 60 opens the inside of the first sub-tank 23 to the atmosphere in a state in which the first opening and closing valve 39 and the second opening and closing valve 40 are opened. As the inside of the second sub-tank 24 is pressurized in this state, the liquid is supplied from the second sub-tank 24 to the head 14 through the second connection channel 38 and is returned from the head 14 to the first sub-tank 23 through the first connection channel 37.

Figure 2:
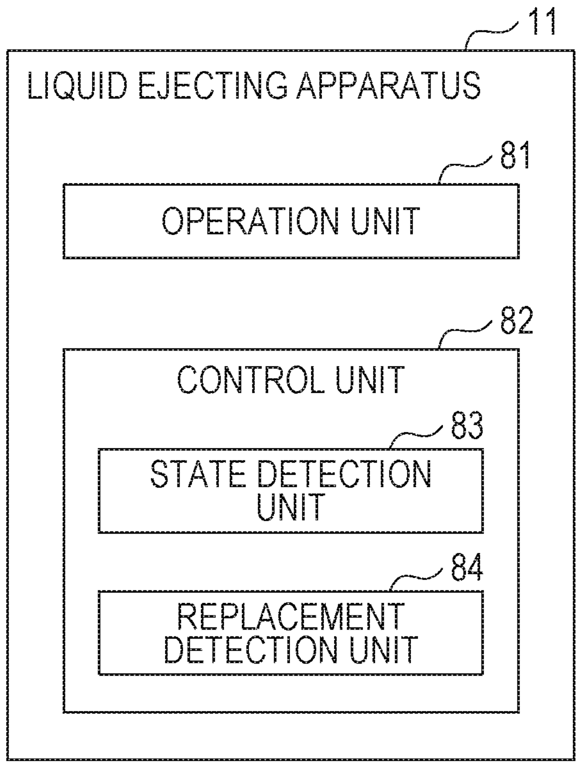
FIG. 2 is a block diagram illustrating an electrical configuration of the liquid ejecting apparatus.

As illustrated in FIG. 2, the liquid ejecting apparatus 11 includes an operation portion 81. The operation portion 81 includes a touch panel, a button, a lever, a switch, and the like. The user gives an instruction to the liquid ejecting apparatus 11 by operating the operation portion 81.

The user may make a replacement notification to the liquid ejecting apparatus 11 by operating the operation portion 81. The replacement notification is a notification for notifying the liquid ejecting apparatus 11 that the liquid container 90 is replaced. The liquid ejecting apparatus 11 may automatically open the cover 13 upon receiving the replacement notification. Upon receiving the replacement notification, the liquid ejecting apparatus 11 may unlock the cover 13 or unlock the liquid container 90 from the mounting portion 22. By doing so, the user can smoothly replace the liquid container 90. The liquid ejecting apparatus 11 may receive the replacement notification not only when the user operates the operation portion 81 but also when the user manually opens the cover 13, for example. Alternatively, the liquid ejecting apparatus 11 may receive the replacement notification from an external terminal communicably connected to the liquid ejecting apparatus 11. The external terminal is, for example, a personal computer, a smart phone, a tablet, or the like owned by the user.

The user may make a completion notification to the liquid ejecting apparatus 11 by operating the operation portion 81. The completion notification is a notification for notifying the liquid ejecting apparatus 11 that the replacement of the liquid container 90 is completed. The liquid ejecting apparatus 11 may automatically close the cover 13 upon receiving the completion notification. Upon receiving the completion notification, the liquid ejecting apparatus 11 may lock the cover 13 or lock the liquid container 90 with respect to the mounting portion 22. The liquid ejecting apparatus 11 may receive the completion notification not only when the user operates the operation portion 81 but also when the user manually closes the cover 13, for example. Alternatively, the liquid ejecting apparatus 11 may receive the completion notification from an external terminal communicably connected to the liquid ejecting apparatus 11.

The liquid ejecting apparatus 11 includes a control portion 82. The control portion 82 controls various components included in the liquid ejecting apparatus 11. The control portion 82 controls, for example, the head 14, the supply mechanism 21, the adjustment mechanism 51, and the like.

The control portion 82 may be implemented by one or more processors that execute various types of processing according to software. The control portion 82 may be implemented by one or more dedicated hardware circuits such as an application-specific integrated circuit (ASIC) that executes at least some of the various types of processing. The control portion 82 may be implemented by a circuit including a combination of a processor and a hardware circuit. The processor includes a central processing portion (CPU) and a memory such as a random access memory (RAM) and a read only memory (ROM). The memory stores a program code or instruction for causing the CPU to execute processing. The memory, that is, a computer-readable medium, includes any readable medium that can be accessed by a general-purpose computer or a special-purpose computer.

The control portion 82 includes a state detection portion 83. The state detection portion 83 is configured to detect the ejection state of the nozzle 16. The control portion 82 functions as the state detection portion 83, for example, by executing a program stored in the memory.

The state detection portion 83 detects the ejection state, for example, based on residual vibration of the liquid in the nozzle 16. The state detection portion 83 can detect the ejection state based on residual vibration that does not accompany liquid ejection. When the ejection state is faulty, a waveform of the residual vibration changes from that when the ejection state is normal. Thereby, the state detection portion 83 detects whether or not the ejection state of the nozzles 16 is faulty. When the ejection state is faulty, there is a possibility that the liquid is not correctly ejected from the nozzle 16. For example, when the meniscus of the liquid formed in the nozzle 16 is disrupted, the ejection state of the nozzle 16 becomes faulty.

The state detection portion 83 is not limited to detecting the ejection state based on the residual vibration, and may detect the ejection state by other methods. For example, the state detection portion 83 may detect the ejection state based on whether or not the liquid ejected from the nozzle 16 has entered a detection range of an optical sensor. For example, the state detection portion 83 may detect the ejection state based on image information obtained by a camera imaging a droplet pattern formed by the nozzle 16 ejecting droplets onto the medium.

The control portion 82 includes a replacement detection portion 84. The replacement detection portion 84 is configured to detect replacement of the liquid container 90 performed while the liquid ejecting apparatus 11 is powered off. The control portion 82 functions as the replacement detection portion 84, for example, by executing a program stored in the memory. The liquid container 90 may be replaced not only while the liquid ejecting apparatus 11 is powered on, but also while the liquid ejecting apparatus 11 is powered off. While the liquid ejecting apparatus 11 is powered on, the control portion 82 can grasp that the liquid container 90 is replaced, by the replacement notification. While the liquid ejecting apparatus 11 is powered off, the control portion 82 cannot grasp that the liquid container 90 is replaced. Therefore, when the liquid ejecting apparatus 11 is powered on, that is, when the liquid ejecting apparatus 11 is turned on, the replacement detection portion 84 detects replacement of the liquid container 90 performed while the liquid ejecting apparatus 11 is powered off.

The liquid container 90 normally includes a storage board that stores information regarding the liquid contained in the liquid container 90. The replacement detection portion 84 acquires the information from the storage board when the liquid container 90 is mounted on the mounting portion 22. The replacement detection portion 84 detects replacement of the liquid container 90 based on a change in information acquired from the storage board. Therefore, the replacement detection portion 84 can detect whether or not the liquid container 90 was replaced while the liquid ejecting apparatus 11 is powered off by acquiring the information from the storage board when the liquid ejecting apparatus 11 is powered on.

Replacement Processing

Next, replacement processing executed by the control portion 82 will be described. The replacement processing is started when the control portion 82 receives the replacement notification.

Figure 3:
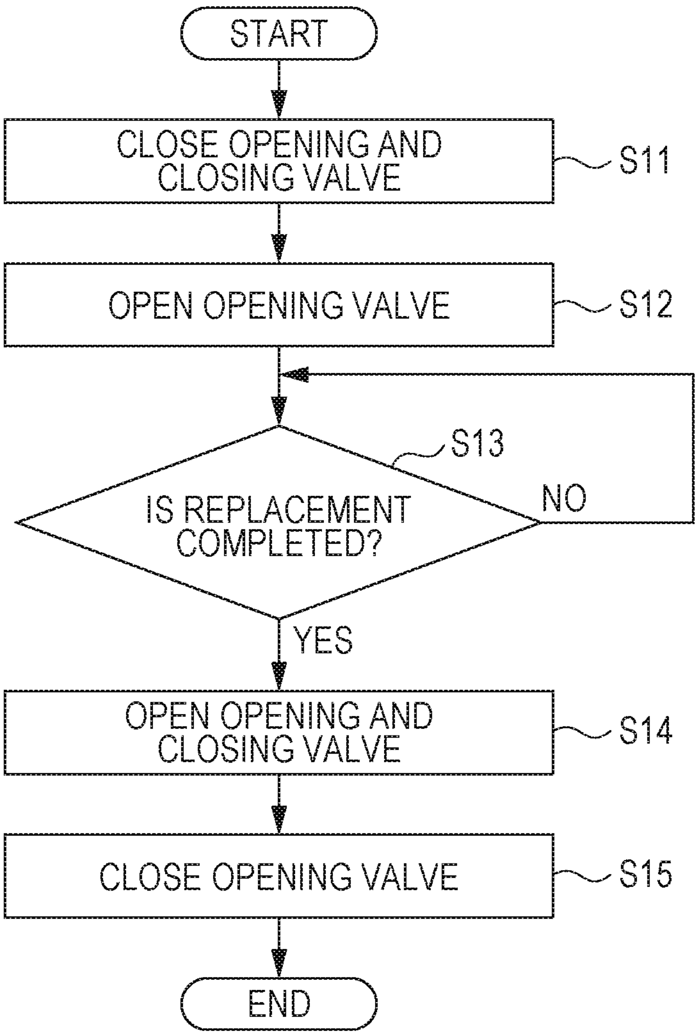
FIG. 3 is a flowchart illustrating replacement processing.

As illustrated in FIG. 3, the control portion 82 closes the opening and closing valve in step S11. Specifically, the control portion 82 closes at least the first opening and closing valve 39 out of the first opening and closing valve 39 and the second opening and closing valve 40. The control portion 82 may close the first opening and closing valve 39 and the second opening and closing valve 40. As a result, a possibility that a negative pressure is applied to the head 14 from a new liquid container 90 mounted on the mounting portion 22.

The control portion 82 opens the opening valve in step S12. Specifically, the control portion 82 opens at least one of the first opening valve 61 or the second opening valve 62. The control portion 82 may open the first opening valve 61 and the second opening valve 62. When opening the inside of the first sub-tank 23 to the atmosphere, the control portion 82 also opens the eighth selection valve 70. When opening the inside of the second sub-tank 24 to the atmosphere, the control portion 82 also opens the ninth selection valve 71. As a result, the negative pressure in the sub-tank caused by the replacement of the liquid container 90 is eliminated.

In steps S11 and S12, it is sufficient if the negative pressure in the liquid container 90 is not applied to the head 14 and the inside of the sub-tank is opened to the atmosphere through the opening channel. For example, it is sufficient if any one of the first opening valve 61 and the second opening valve 62 is opened in a state in which the first opening and closing valve 39 is closed and the eighth selection valve 70 is opened. For example, it is sufficient if any one of the first opening valve 61 and the second opening valve 62 is opened in a state in which the second opening and closing valve 40 is closed and the ninth selection valve 71 is opened. For example, it is sufficient if any one of the first opening valve 61 and the second opening valve 62 is opened in a state in which the first opening and closing valve 39 and the second opening and closing valve 40 are closed and the eighth selection valve 70 and the ninth selection valve 71 are opened. Here, step S11 may be performed after step S12, or step S11 and step S12 may be performed at the same time.

In step S13, the control portion 82 determines whether or not the replacement of the liquid container 90 is completed. When receiving the completion notification, the control portion 82 determines that the replacement of the liquid container 90 is completed, and the processing proceeds to step S14. The control portion 82 waits in step S13 until receiving the completion notification.

The control portion 82 opens the opening and closing valve in step S14. Specifically, the control portion 82 opens both the first opening and closing valve 39 and the second opening and closing valve 40. The control portion 82 closes the opening valve in step S15. Specifically, the control portion 82 closes both the first opening valve 61 and the second opening valve 62. After the processing of step S15 ends, the control portion 82 ends the replacement processing. By the replacement processing, the liquid container 90 is replaced without applying a negative pressure to the head 14. Here, step S14 may be performed after step S15, or step S14 and step S15 may be performed at the same time.

Recovery Processing

Next, recovery processing executed by the control portion 82 will be described. The recovery processing is started in a case in which the replacement detection portion 84 detects, when the liquid ejecting apparatus 11 is powered on, replacement of the liquid container 90 performed while the liquid ejecting apparatus 11 is powered off. Therefore, the recovery processing is executed when the liquid ejecting apparatus 11 is turned on.

Figure 4:
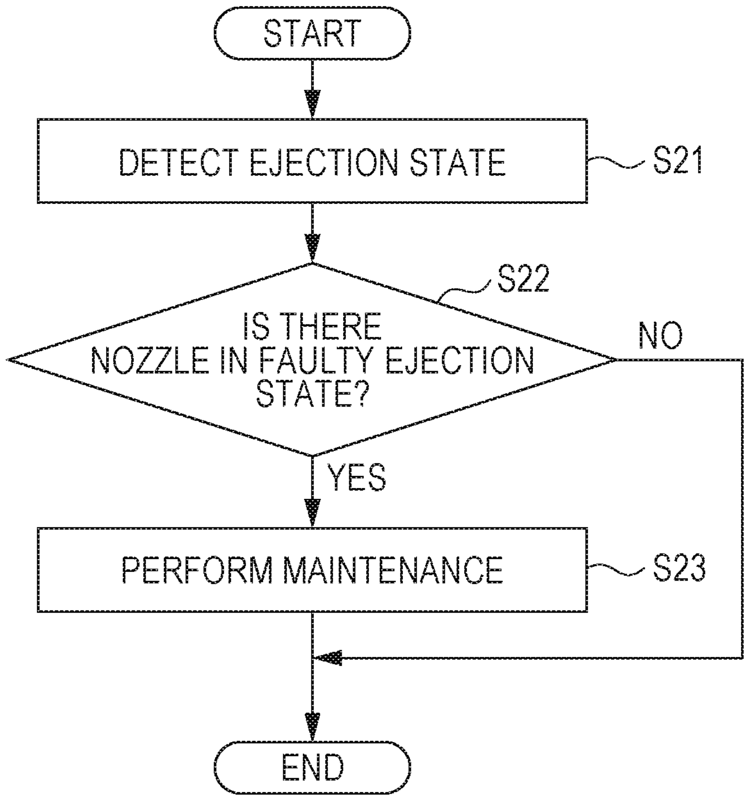
FIG. 4 is a flowchart illustrating recovery processing.

As illustrated in FIG. 4, the control portion 82 causes the state detection portion 83 to detect the ejection state of the nozzle 16 in step S21. When the liquid container 90 was replaced while the liquid ejecting apparatus 11 is powered off, a negative pressure is applied to the head 14, and thus, the ejection state of the nozzle 16 tends to be faulty.

In step S22, the control portion 82 determines whether or not there is a nozzle 16 with a faulty ejection state. When it is determined that there is a nozzle 16 with a faulty ejection state, the control portion 82 proceeds to step S23. When it is determined that there is no nozzle 16 with a faulty ejection state, the control portion 82 ends the recovery processing.

The control portion 82 causes the maintenance portion 17 to perform maintenance of the head 14 in step S23. At this time, the head 14 is subjected to the pressure cleaning or the suction cleaning. By doing so, the faulty ejection state is eliminated. Therefore, the ejection state of the nozzles 16 is recovered to be normal. When the low-pressure cleaning performed in a case in which there is a nozzle 16 with a faulty ejection state, there is a high possibility that air is drawn from the nozzle 16 as the air chamber 45 is depressurized. This is because the meniscus formed in the nozzle 16 is likely to be disrupted when the ejection state is faulty. Therefore, in the recovery processing, the head 14 is not subjected to the low-pressure cleaning.

Action and Effect

Next, an action and an effect of the above-described embodiment will be described.

(1) When the liquid container 90 is replaced, the control portion 82 closes the opening and closing valve. When a new liquid container 90 is mounted on the mounting portion 22 in a state in which the opening and closing valve is opened, the negative pressure in the liquid container 90 is applied to the head 14 through the sub-tank. When the negative pressure is applied to the head 14, there is a possibility that air is drawn through the nozzle 16. According to the above-described configuration, the opening and closing valve is closed when the liquid container 90 is replaced, and thus, a possibility that the negative pressure inside the liquid container 90 is applied to the head 14 is reduced.

(2) When the liquid container 90 is replaced, the control portion 82 opens the opening valve. Normally, the inside of the sub-tank is opened to the atmosphere through the capillary channel 54. When a new liquid container 90 is mounted on the mounting portion 22, the negative pressure in the liquid container 90 is applied to the sub-tank. At this time, even when the inside of the sub-tank is opened to the atmosphere through the capillary channel 54, the capillary portion 55 makes it difficult for air to flow into the sub-tank. Therefore, it is difficult to eliminate the negative pressure in the sub-tank. According to the above-described configuration, when the liquid container 90 is replaced, the opening valve is opened, so that the inside of the sub-tank is opened to the atmosphere through the opening channel. The negative pressure in the sub-tank is quickly eliminated by air flowing into the sub-tank through the opening channel.

(3) In a case in which the replacement detection portion 84 detects, when the liquid ejecting apparatus 11 is powered on, replacement of the liquid container 90 performed while the liquid ejecting apparatus 11 is powered off, the control portion 82 causes the state detection portion 83 to detect the ejection state of the nozzle 16. The control portion 82 causes the maintenance portion 17 to perform maintenance of the head 14 when the state detection portion 83 detects that the ejection state of the nozzle 16 is faulty. When the liquid container 90 is replaced while the liquid ejecting apparatus 11 is powered off, the opening and closing valve remains open. Therefore, there is a possibility that the ejection state of the nozzle 16 becomes faulty due to the negative pressure applied to the head 14. In this respect, according to the above-described configuration, when the ejection state of the nozzle 16 has become faulty due to replacement of the liquid container 90 performed while the liquid ejecting apparatus 11 is powered off, the maintenance portion 17 eliminates the faulty ejection state.

Modified Example

The above-described embodiment can be modified as follows. The above-described embodiment and the following modified example can be implemented in combination within a technically consistent range.

The liquid ejected by the head 14 is not limited to ink, and may be, for example, liquid in which functional material particles are dispersed or mixed. For example, the head 14 may eject liquid containing a dispersed or dissolved material such as an electrode material or a pixel material used in manufacturing of a liquid crystal display, an electroluminescence display, a surface emitting display, or the like.

Technical Idea

Hereinafter, the technical ideas and the actions and effects that can be grasped from the above-described embodiment and modified example are described.

(A) A liquid ejecting apparatus includes: a head that ejects a liquid from a nozzle; a mounting portion on which a liquid container in which the liquid is sealed is detachably mounted; a sub-tank in which the liquid supplied from the liquid container is stored; a connection channel connected to the sub-tank and the head; an opening and closing valve positioned in the connection channel; and a control portion, in which when the liquid container is replaced, the control portion closes the opening and closing valve.

When a new liquid container is mounted on the mounting portion in a state in which the opening and closing valve is opened, a negative pressure in the liquid container is applied to the head through the sub-tank. When the negative pressure is applied to the head, there is a possibility that air is drawn from the nozzle. According to the above-described configuration, the opening and closing valve is closed when the liquid container is replaced, and thus, a possibility that the negative pressure inside the liquid container is applied to the head is reduced.

(B) The liquid ejecting apparatus may further include: a capillary channel that opens the inside of the sub-tank to the atmosphere; an opening channel that opens the inside of the sub-tank to the atmosphere; and an opening valve positioned in the opening channel, in which the capillary channel may include a capillary portion, and the control portion may open the opening valve when the liquid container is replaced.

Normally, the inside of the sub-tank is opened to the atmosphere through the capillary channel. When a new liquid container is mounted on the mounting portion, the negative pressure in the liquid container is applied to the sub-tank. At this time, even when the inside of the sub-tank is opened to the atmosphere through the capillary channel, the capillary portion makes it difficult for air to flow into the sub-tank. Therefore, it is difficult to eliminate the negative pressure in the sub-tank. According to the above-described configuration, when the liquid container is replaced, the opening valve is opened, so that the inside of the sub-tank is opened to the atmosphere through the opening channel. The negative pressure in the sub-tank is quickly eliminated by air flowing into the sub-tank through the opening channel.

(C) The liquid ejecting apparatus may further include: a state detection portion that detects an ejection state of the nozzle; a replacement detection portion that detects replacement of the liquid container performed while the liquid ejecting apparatus is powered off; and a maintenance portion that performs maintenance of the head, in which in a case in which the replacement detection portion detects, when the liquid ejecting apparatus is powered on, replacement of the liquid container performed while the liquid ejecting apparatus is powered off, the control portion causes the state detection portion to detect the ejection state of the nozzle, and the control portion causes the maintenance portion to perform maintenance of the head when the state detection portion detects that the ejection state of the nozzle is faulty.

When the liquid container is replaced while the liquid ejecting apparatus is powered off, the opening and closing valve remains open. Therefore, there is a possibility that the ejection state of the nozzle becomes faulty due to the negative pressure applied to the head. In this respect, according to the above-described configuration, when the ejection state of the nozzle has become faulty due to replacement of the liquid container performed while the liquid ejecting apparatus is powered off, the maintenance portion eliminates the faulty ejection state.

(D) A control method of a liquid ejecting apparatus including a head that ejects a liquid from a nozzle, a mounting portion on which a liquid container in which the liquid is sealed is detachably mounted, a sub-tank in which the liquid supplied from the liquid container is stored, a connection channel that connects the sub-tank and the head, and an opening and closing valve positioned in the connection channel, includes: closing the opening and closing valve when the liquid container is replaced. With the above-described method, the same effects as that of the liquid ejecting apparatus described above can be obtained.

(E) The control method may further include: opening an opening valve when the liquid container is replaced, in which the liquid ejecting apparatus may further include a capillary channel that opens an inside of the sub-tank to an atmosphere, an opening channel that opens the inside of the sub-tank to the atmosphere, and the opening valve positioned in the opening channel, and the capillary channel may include a capillary portion. With the above-described method, the same effects as that of the liquid ejecting apparatus described above can be obtained.

(F) The control method may further include: detecting an ejection state of the nozzle in a case in which replacement of the liquid container performed while the liquid ejecting apparatus is powered off is detected when the liquid ejecting apparatus is powered on; and performing maintenance of the head when it is detected that the ejection state of the nozzle is faulty. With the above-described method, the same effects as that of the liquid ejecting apparatus described above can be obtained.

What is claimed is:

1. A liquid ejecting apparatus comprising:
a head that ejects a liquid from a nozzle;
a liquid container;
a mounting portion on which the liquid container in which the liquid is sealed is detachably mounted;
a sub-tank in which the liquid supplied from the liquid container due to a head difference is stored;
a connection channel connected to the sub-tank and the head;
an opening and closing valve positioned in the connection channel;
a state detection portion that detects an ejection state of the nozzle;
a replacement detection portion that detects replacement of the liquid container performed while the liquid ejecting apparatus is powered off;
a maintenance portion that performs maintenance of the head, and
a control portion,
wherein when the liquid container is replaced, the control portion closes the opening and closing valve,
wherein in a case in which the replacement detection portion detects, when the liquid ejecting apparatus is powered on, replacement of the liquid container performed while the liquid ejecting apparatus is powered off, the control portion causes the state detection portion to detect the ejection state of the nozzle, and the control portion causes the maintenance portion to perform maintenance of the head when the state detection portion detects that the ejection state of the nozzle is faulty.

2. A liquid ejecting apparatus comprising:
a head that ejects a liquid from a nozzle;
a mounting portion on which a liquid container in which the liquid is sealed is detachably mounted;
a sub-tank in which the liquid supplied from the liquid container is stored;
a connection channel connected to the sub-tank and the head;
an opening and closing valve positioned in the connection channel
a control portion;
a capillary channel that opens an inside of the sub-tank to an atmosphere;
an opening channel that opens the inside of the sub-tank to the atmosphere; and
an opening valve positioned in the opening channel, wherein
when the liquid container is replaced, the control portion closes the opening and closing valve,
the capillary channel includes a capillary portion, and
the control portion opens the opening valve when the liquid container is replaced.

3. A control method of a liquid ejecting apparatus including a head that ejects a liquid from a nozzle, a mounting portion on which a liquid container in which the liquid is sealed is detachably mounted, a sub-tank in which the liquid supplied from the liquid container is stored, a connection channel that connects the sub-tank and the head, an opening and closing valve positioned in the connection channel, a capillary channel that opens an inside of the sub-tank to an atmosphere, the capillary channel including a capillary portion, an opening channel that opens the inside of the sub-tank to the atmosphere, and an opening valve positioned in the opening channel, the control method comprising:

closing the opening and closing valve when the liquid container is replaced, and opening the opening valve when the liquid container is replaced.

4. The control method according to claim 3, further comprising:

detecting an ejection state of the nozzle in a case in which replacement of the liquid container performed while the liquid ejecting apparatus is powered off is detected when the liquid ejecting apparatus is powered on; and performing maintenance of the head when it is detected that the ejection state of the nozzle is faulty.

* * * * *